No. 817,666. PATENTED APR. 10, 1906.
T. H. PRICE & W. P. QUENTELL.
COTTON HARVESTER.
APPLICATION FILED JAN. 13, 1905.
3 SHEETS—SHEET 3.
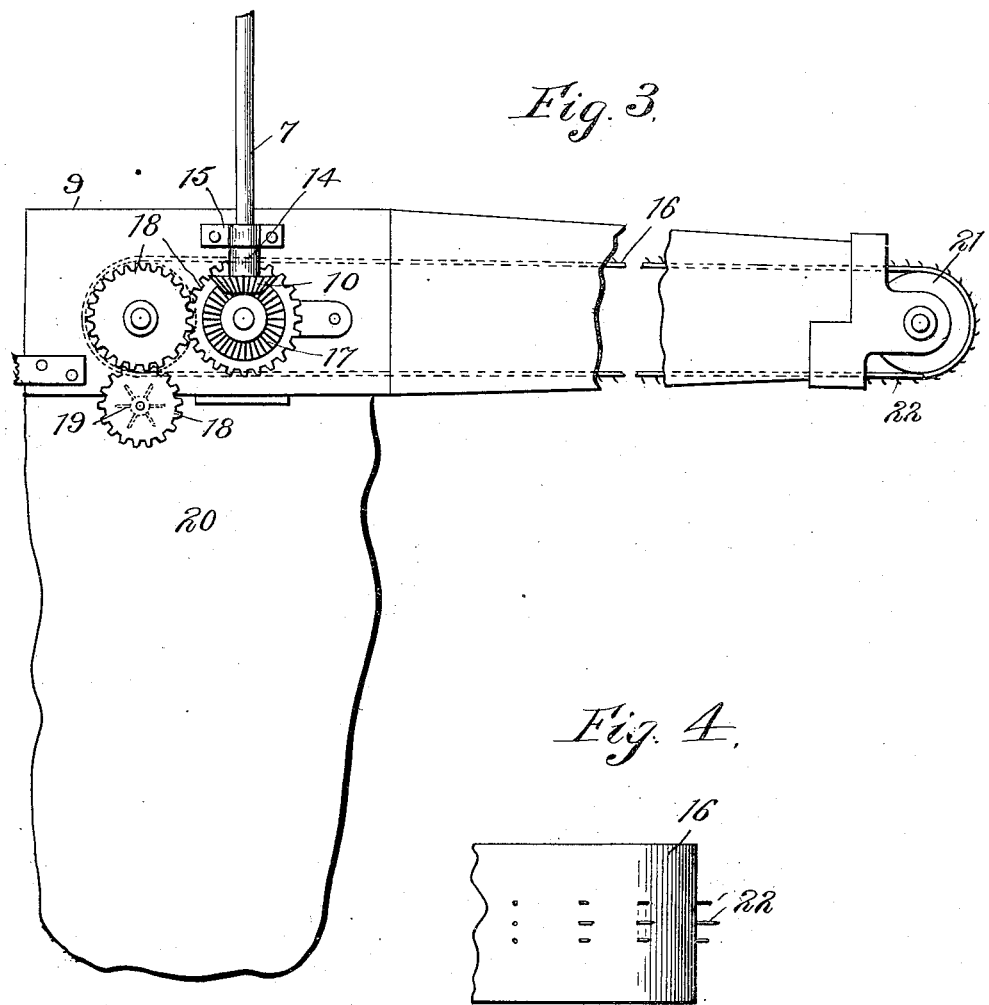

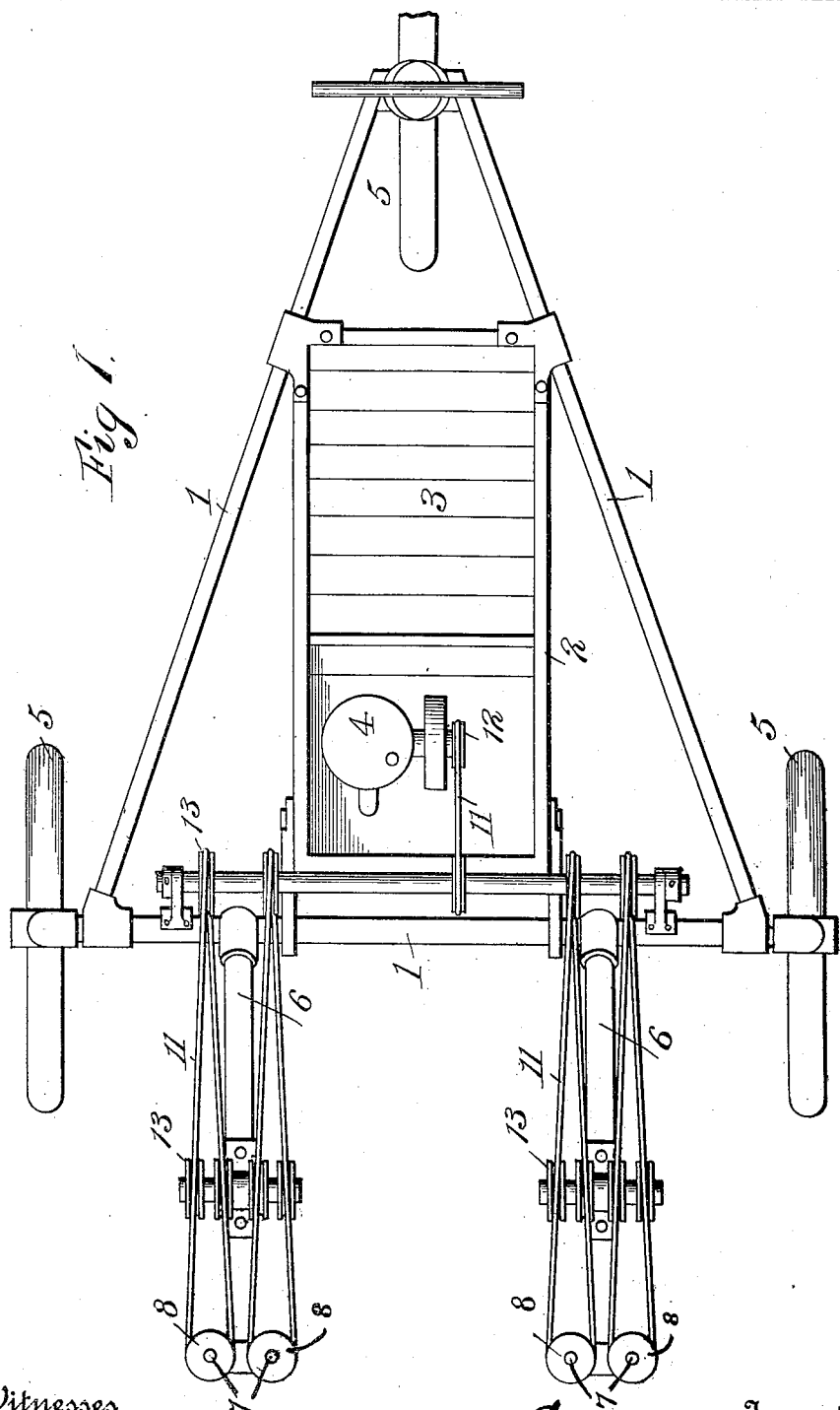

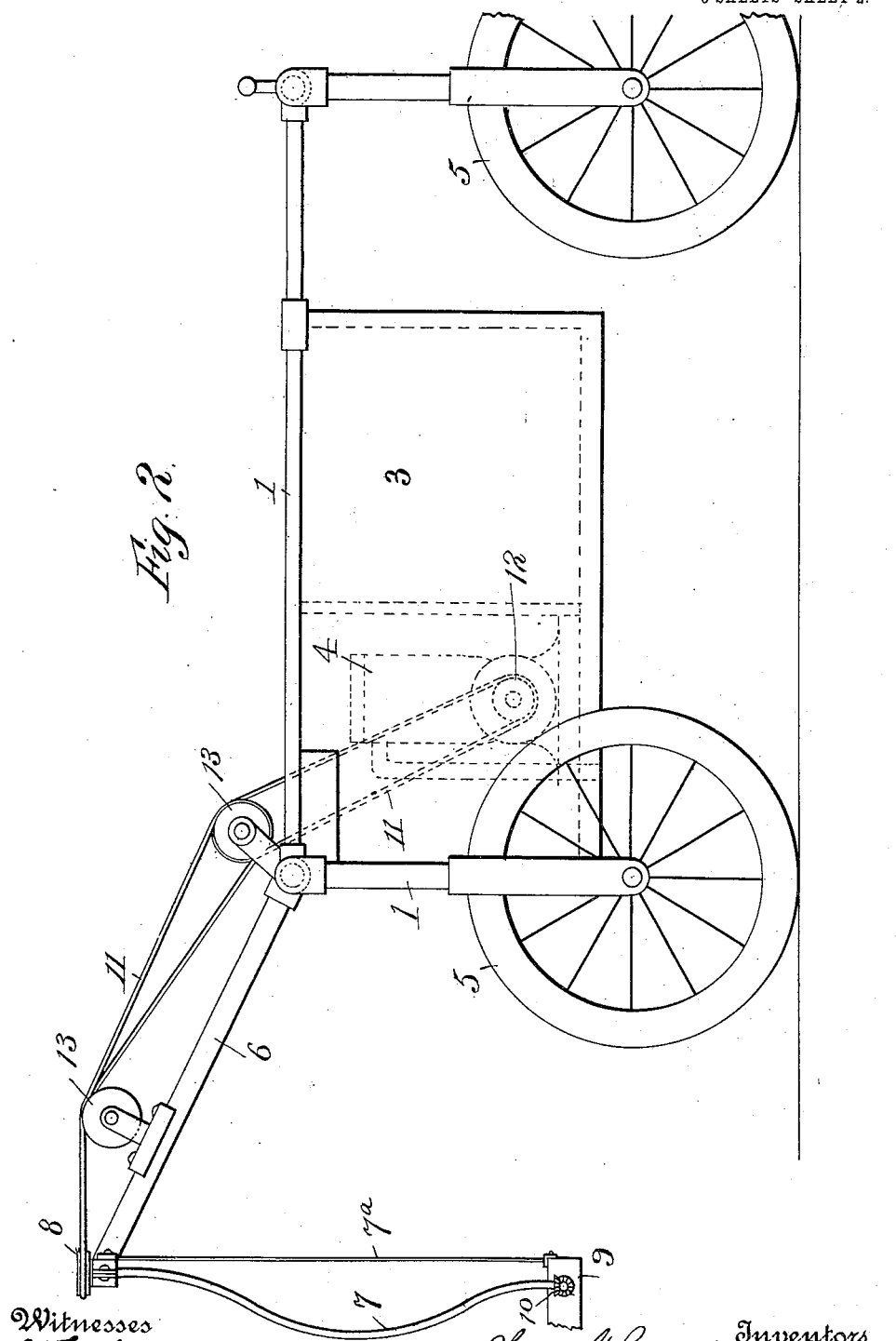

UNITED STATES PATENT OFFICE.

THEODORE H. PRICE AND WILLIAM P. QUENTELL, OF NEW YORK, N. Y., ASSIGNORS TO UTILITY COTTON PICKER COMPANY, OF NEW YORK, N. Y., A CORPORATION OF NEW YORK.

COTTON-HARVESTER.

No. 817,666.   Specification of Letters Patent.   Patented April 10, 1906.

Application filed January 13, 1905. Serial No. 240,889.

*To all whom it may concern:*

Be it known that we, THEODORE H. PRICE and WILLIAM P. QUENTELL, citizens of the United States of America, residing in the borough of Manhattan, city and State of New York, have invented certain new and useful Improvements in Cotton-Harvesters, of which the following is a specification.

Our invention relates to a cotton-harvester in which a vehicle, preferably mounted on wheels and carrying a source of power—as, for example, a gasolene-motor—carries power-conveying apparatus for transmission of power from such motor to a series of individual cotton-picking instruments which are manipulated by operators in the field; and the present invention relates particularly to the devices for supporting the cotton-picking instruments for supplying power thereto and the specific construction of the cotton-picking instrument itself.

In the accompanying drawings, Figure 1 is a plan view of our improved cotton-harvester. Fig. 2 is a side elevation thereof. Fig. 3 is an elevation with parts broken away of the cotton-picking instrument, and Fig. 4 is a detail plan view of a portion of the picking-belt.

We have shown as the vehicle a frame 1, carrying a platform 2, which may have at 3 a receptacle for the cotton gathered by the several picking instruments and which carries the motor 4, preferably a gasolene-engine. The frame 1 is mounted upon carrying-wheels 5. Motive power for the vehicle may be employed; but it is intended in the present instance that the vehicle shall be drawn through the field by the operators of the picking instruments, or by an additional operator, who attends to the vehicle alone, or by power. Projecting forward from the front of the frame 1 are upwardly-projecting inclined arms 6, here shown to be two in number and supporting at their forward and upper ends pendent driving-shafts 7, which are preferably flexible shafts of the usual form—that is to say, having the usual non-rotating external sheath—which is clamped in the upper ends of the arms 6, and an inner rotating shaft driven by the pulley 8. The barrel or casing 9 of the picking instrument may be hung from the cord 7ª, depending from the arm 6. The interior rotating core of the shaft 7 is connected by bevel-gear 10, Fig. 3, to the interior operating-gear of the picking instrument. We have shown in Fig. 1 the supporting of four of the pulleys 8 and their corresponding flexible shafts upon the arms 6. Bevel-gears or other well-known or preferred means of driving the flexible shafts 7 may be used. In the present instance we have shown the pulleys 8 receiving motion from the motor 4 by belts 11 passing over a driving-pulley 12 on the motor and over pulleys 13.

Referring again to Fig. 3, it will be seen that the outer sheath of the flexible shaft has at its lower end a head or collar 14, which, engaging below the bracket 15 or other fixed point on the casing or barrel of the picking instrument, will serve, in connection with or in place of cord 7ª, to support the picking instrument.

16 is the picking-belt, driven from the flexible shaft in any desired manner. As here shown it is driven by the engagement of bevel-gear 10 with bevel-gear 17, which drives, through pinions 18, the pulley of the belt and the shaft of the doffing-brush 19, which delivers the picked cotton into the suspended receptacle 20, which is emptied into the common receptacle 3 of the vehicle. The peculiar construction of the picking-belt here shown is important. One of the important reasons for using the individually-directed picking instrument is to enable the selection of the cotton to be picked. For practical operation it is found that the chamber of the barrel or casing of the picker must be made wide enough to carry the cotton through without jamming. It is important that the picking-belt be of sufficient length to project beyond the barrel of the picking instrument and also be of the full width of the chamber of the casing or barrel of the picking instrument, so as to afford a complete conveying-surface for carrying the cotton from the front to the rear of the barrel and prevent any cotton falling down to the side of its outer supporting-roller 21 (which is located beyond the barrel to support the projecting part of the picking-belt) or into the interior of the barrel between the two parts of the belt; but it is also important that the picking-surface be narrow enough to enter the ripe bolls of cotton. If the picking-fingers are arranged in lines the full width of the belt, they will when the picking instrument is applied to a boll which is not completely open kick the leaves of the boll, and so knock the latter away and prevent the picking of the cotton. We find it, therefore, desirable to arrange the lines of picking-fingers 22 in a plurality of rows, occupying a central strip of much less width than the full width of the belt 16, as shown in Fig. 4. We find in practice, for example, that with three rows of picking-fingers of a total width of about three-eighths of an inch and on a belt of about one and one-fourth inches in width, very satisfactory results are obtained. If the belt and the chamber of the barrel themselves were reduced to the width of the combined rows of picking-fingers, they would not be wide enough for practical operation, because the cotton would jam in the barrel. We have also found in practice that a great advantage in getting down into the boll is attained by arranging the central row of picking-fingers longer than the exterior rows, as shown in Fig. 4, the result being a formation of a picking-surface which is nearly analogous to the fingers of the hand and enabling the picking of the bolls with much greater certainty. The method of mounting the pins or fingers upon the picking-belt may vary as desired; but the method ordinarily adopted on carding-belts is a practical one.

The operation will now be understood. The operators walking in the field are enabled to direct the picking instruments to the bolls of cotton to be picked, selecting such as are ripe. The rapid-running belt 16, driven from the power on the vehicle, gathers the cotton and conveys it through the barrel of the picking instrument and delivers it to the receptacle 20, from which it is from time to time emptied into the common receptacle 3 on the vehicle. In the present invention it is not intended that the picking instruments shall be carried by the operators, they being in all usual positions of use suspended from the forwardly-projecting bracket-arms 6. The use of the arms 6 enables us to carry the point of conveying power and support to the picking instruments out to a point away from the vehicle proper, and by having the flexible support depending perpendicularly over the picking instrument the latter's weight is directly supported and it can be swung around and directed to any position with less effort than if the shaft were connected horizontally to the vehicle and the picking instruments were carried by the operator.

Having thus described our invention, what we claim as new, and desire to secure by Letters Patent, is—

1. A picking instrument comprising a barrel, a picking-belt of the full width of the chamber of the barrel and projecting therebeyond, having a plurality of longitudinal rows of picking-fingers located centrally of the picking-belt so as to leave plain carrying-surfaces upon opposite sides of the picking-fingers, and means for operating the picking-belt.

2. A picking instrument comprising a barrel, a picking-belt, having a plurality of longitudinal rows of picking-fingers located centrally of the picking-belt so as to leave plain carrying-surfaces upon opposite sides of the picking-fingers, the picking-fingers of the central row of picking-fingers being of greater length than the outer rows of picking-fingers, and means for operating the picking-belt.

3. A picking instrument comprising a barrel, a picking-belt of the full width of the barrel and projecting therebeyond having a plurality of longitudinal rows of picking-fingers located centrally of the picking-belt so as to leave plain carrying-surfaces upon opposite sides of the picking-fingers, and means for operating the picking-belt consisting of intermeshing pinions, bevel gear-wheels, and a flexible driving-shaft mounted upon the barrel.

4. The combination of a vehicle, a power mechanism carried by the vehicle, a picking instrument comprising a barrel, a cotton-receptacle, a picking-belt having picking-fingers, and mechanism mounted upon the barrel for operating the picking-belt, means whereby the picking instrument is suspended from the vehicle and a flexible driving-shaft suspended from the vehicle and connecting the power mechanism with the mechanism of the picking-belt.

5. The combination of a vehicle, having upwardly-projecting inclined arms, a power mechanism carried by the vehicle, a picking instrument comprising a barrel, a cotton-receptacle, a picking-belt having picking-fingers and mechanism mounted upon the barrel for operating the picking-belt, means whereby the picking instrument is suspended from the inclined arms and a flexible driving-shaft suspended from the vehicle and connecting the power mechanism with the mechanism of the picking-belt.

6. The combination of a vehicle and power mechanism carried by the vehicle, a picking instrument comprising a barrel or casing, a belt mounted in said casing for conveying the cotton, driving mechanism for the belt mounted upon said casing, means whereby the casing is suspended from the vehicle, and a flexible driving-shaft connecting the power mechanism with the belt-driving mechanism on said casing.

THEODORE H. PRICE.
WILLIAM P. QUENTELL.

Witnesses:
R. R. COATS,
A. S. MASON.